No. 794,462. PATENTED JULY 11, 1905.
G. A. MASTERS.
REFRIGERATOR.
APPLICATION FILED MAR. 27, 1902.

7 SHEETS—SHEET 1.

WITNESSES:
Sidney E. Masters.
Geo. L. Chindahl

INVENTOR
George A. Masters
By Luther L. Miller
ATTORNEY

No. 794,462. PATENTED JULY 11, 1905.
G. A. MASTERS.
REFRIGERATOR.
APPLICATION FILED MAR. 27, 1902.

7 SHEETS—SHEET 4.

WITNESSES:
Sidney E. Masters.
Geo. L. Chindahl

INVENTOR
George A. Masters
By Luther L. Miller
ATTORNEY

No. 794,462. PATENTED JULY 11, 1905.
G. A. MASTERS.
REFRIGERATOR.
APPLICATION FILED MAR. 27, 1902.

7 SHEETS—SHEET 5.

WITNESSES:
Sidney E. Masters.
Geo. L. Chindahl

INVENTOR
George A. Masters
By Luther L. Miller
ATTORNEY

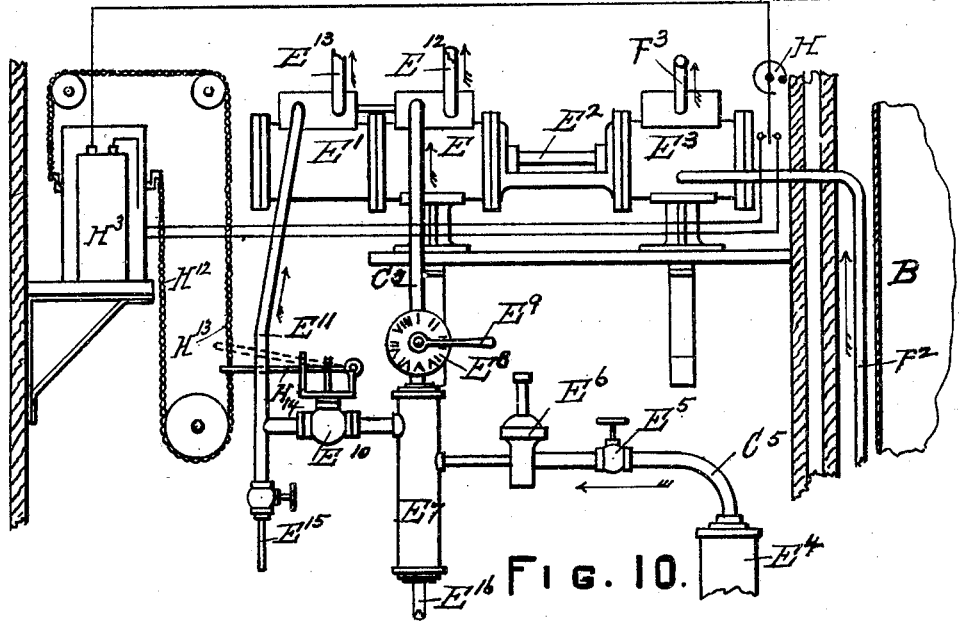
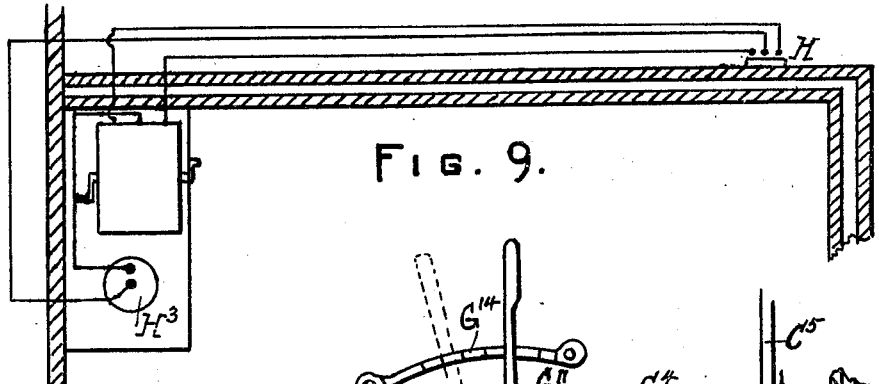
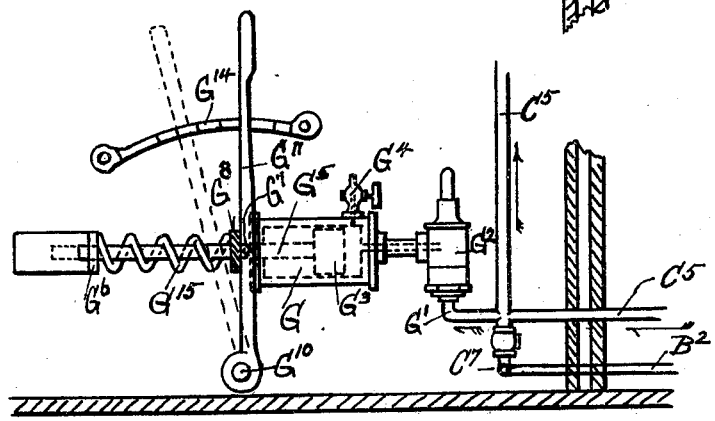

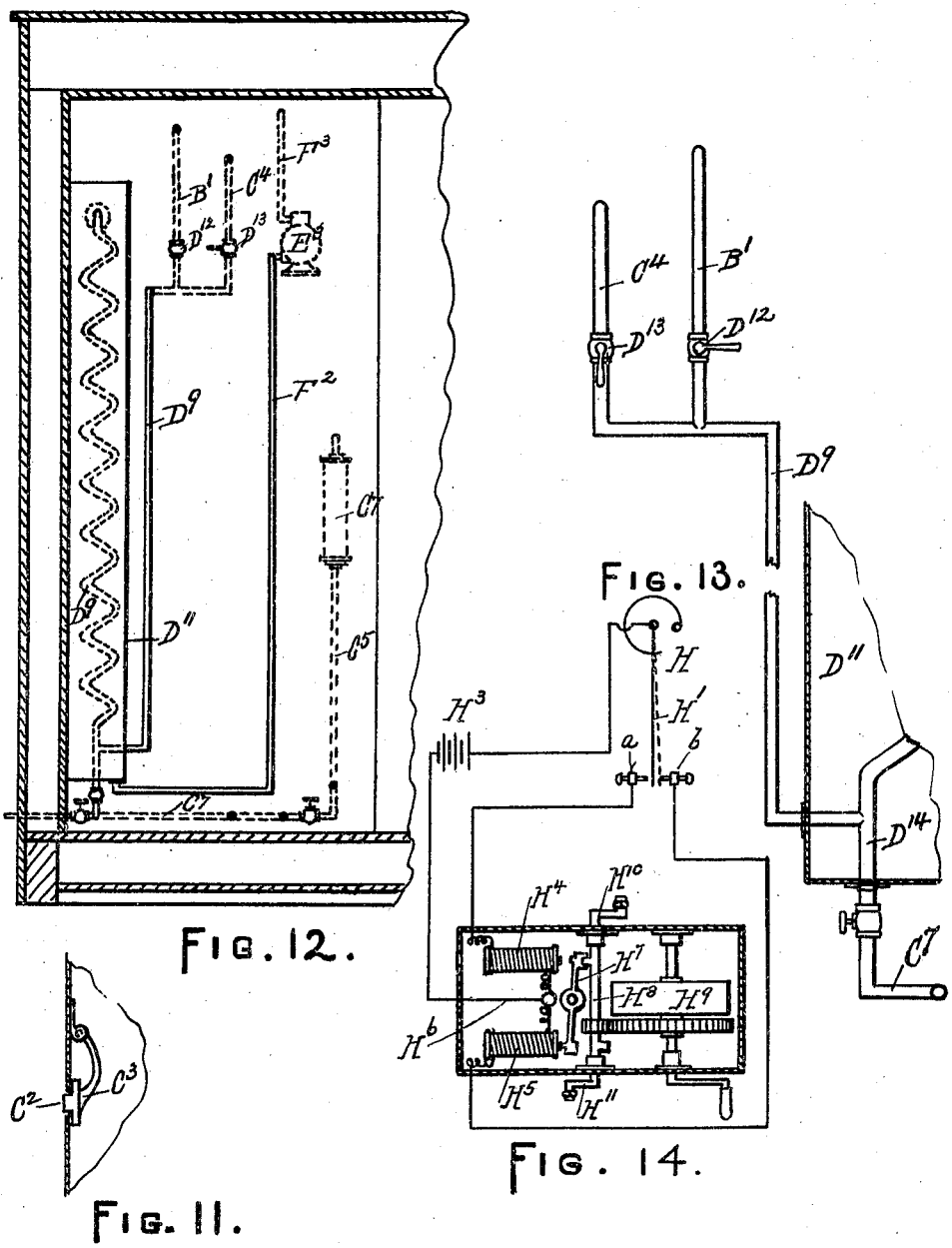

No. 794,462. Patented July 11, 1905.

UNITED STATES PATENT OFFICE.

GEORGE A. MASTERS, OF CHICAGO, ILLINOIS.

REFRIGERATOR.

SPECIFICATION forming part of Letters Patent No. 794,462, dated July 11, 1905.

Application filed March 27, 1902. Serial No. 100,263.

*To all whom it may concern:*

Be it known that I, GEORGE A. MASTERS, a citizen of the United States, residing at Chicago, in the county of Cook and State of Illinois, have invented certain new and useful Improvements in Refrigerators, of which the following is a specification.

The object of this invention is the production of mechanical means for producing a low degree of temperature.

It is a well-known fact that air when it is compressed gives off much of its latent heat and when expanded to its normal pressure regains the same amount of heat that it lost while being compressed. In the production of this refrigerating mechanism I avail myself of this natural law, compressing air by any suitable means, storing this compressed air in tanks, and permitting it to escape from said tanks and expand as needed to maintain a low degree of temperature within the cold room. The pressure maintained within the tanks is sufficient to drive a pump with the expanding air, which pump is employed to produce a circulation of water for cooling the warm compressed air.

While in the embodiment herein shown of this invention it is represented in its application to a railway-car, I do not wish to be understood as limiting myself to this or any other of the many forms in which it may be used.

Figure 1:
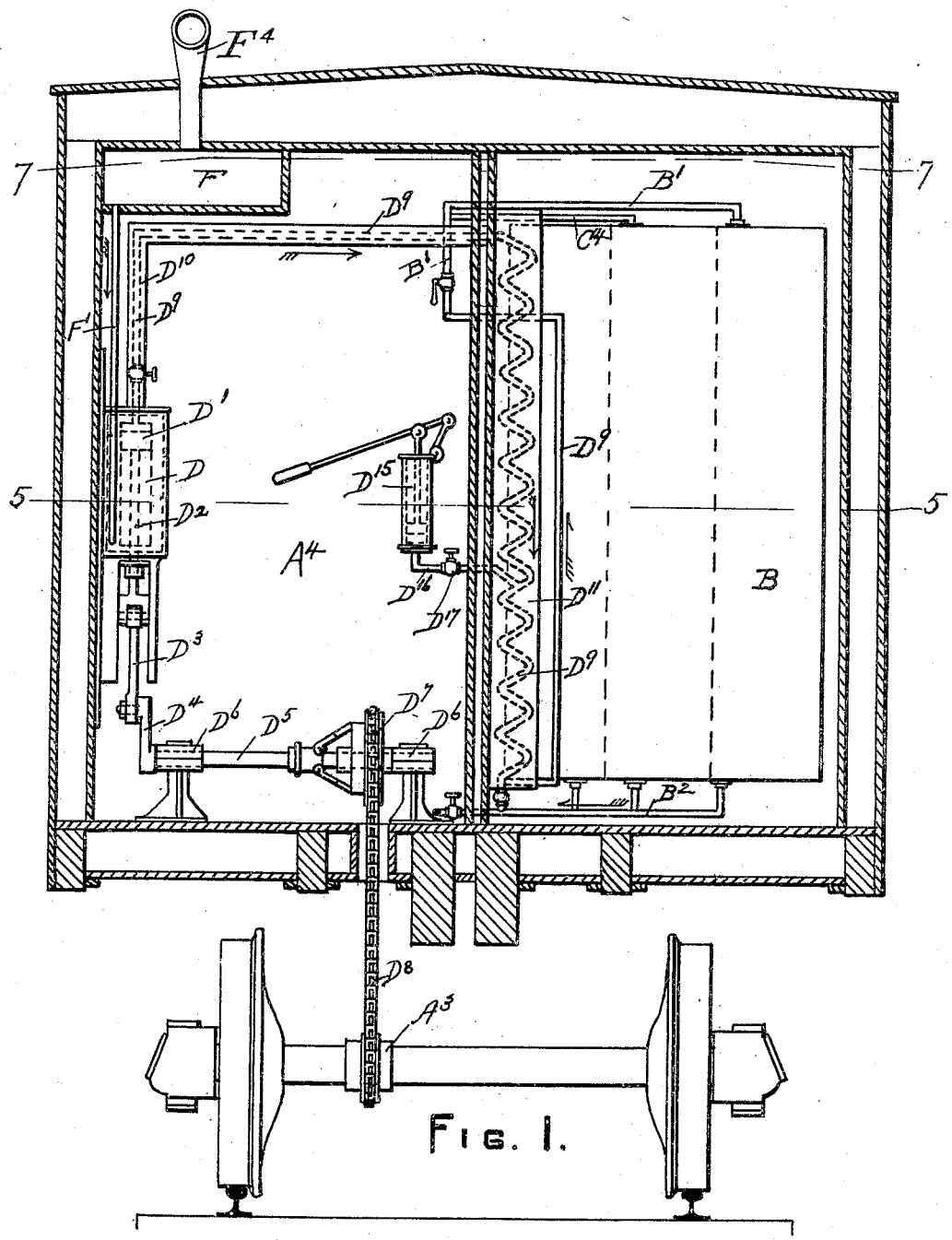
Figure 2:
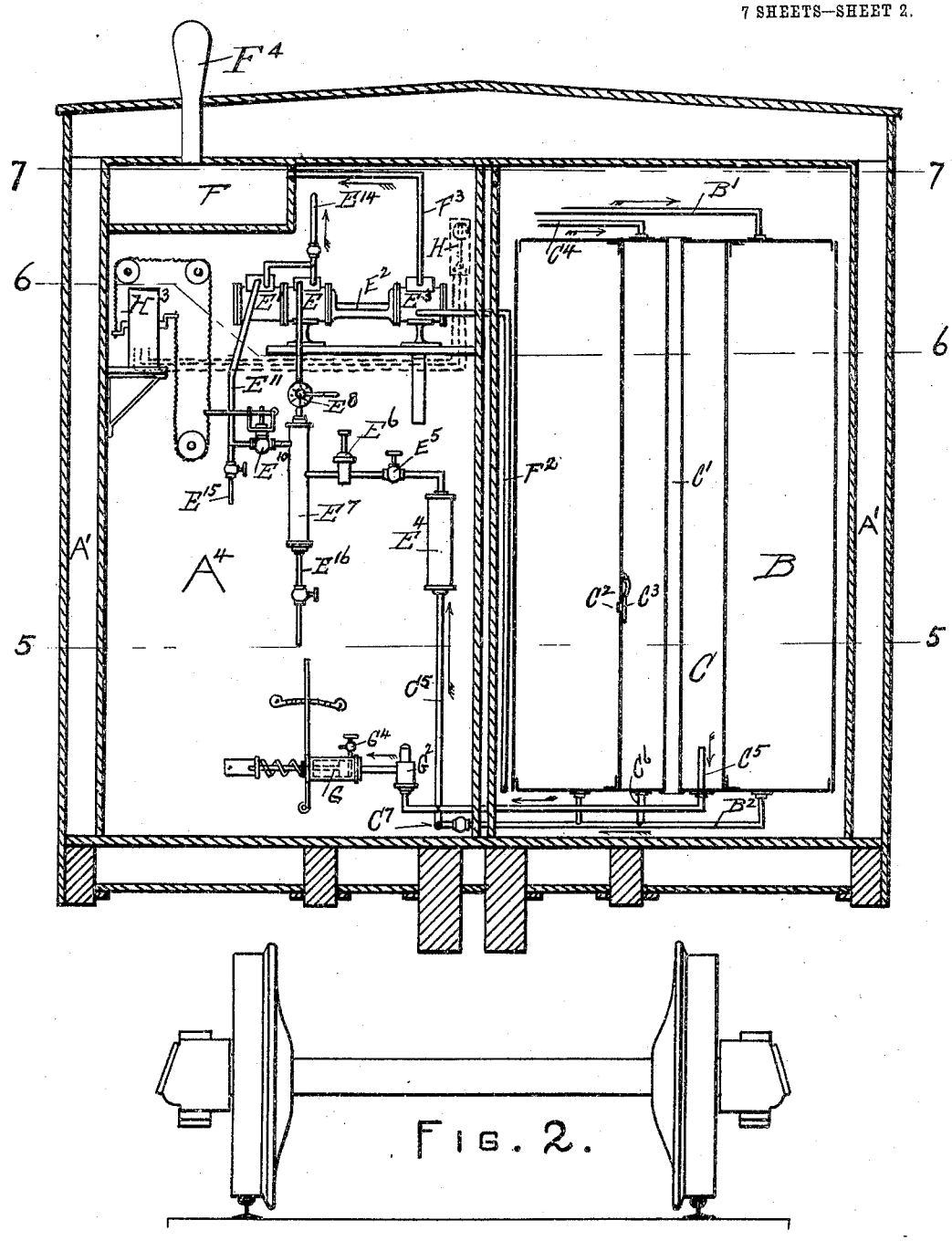
Figure 3:
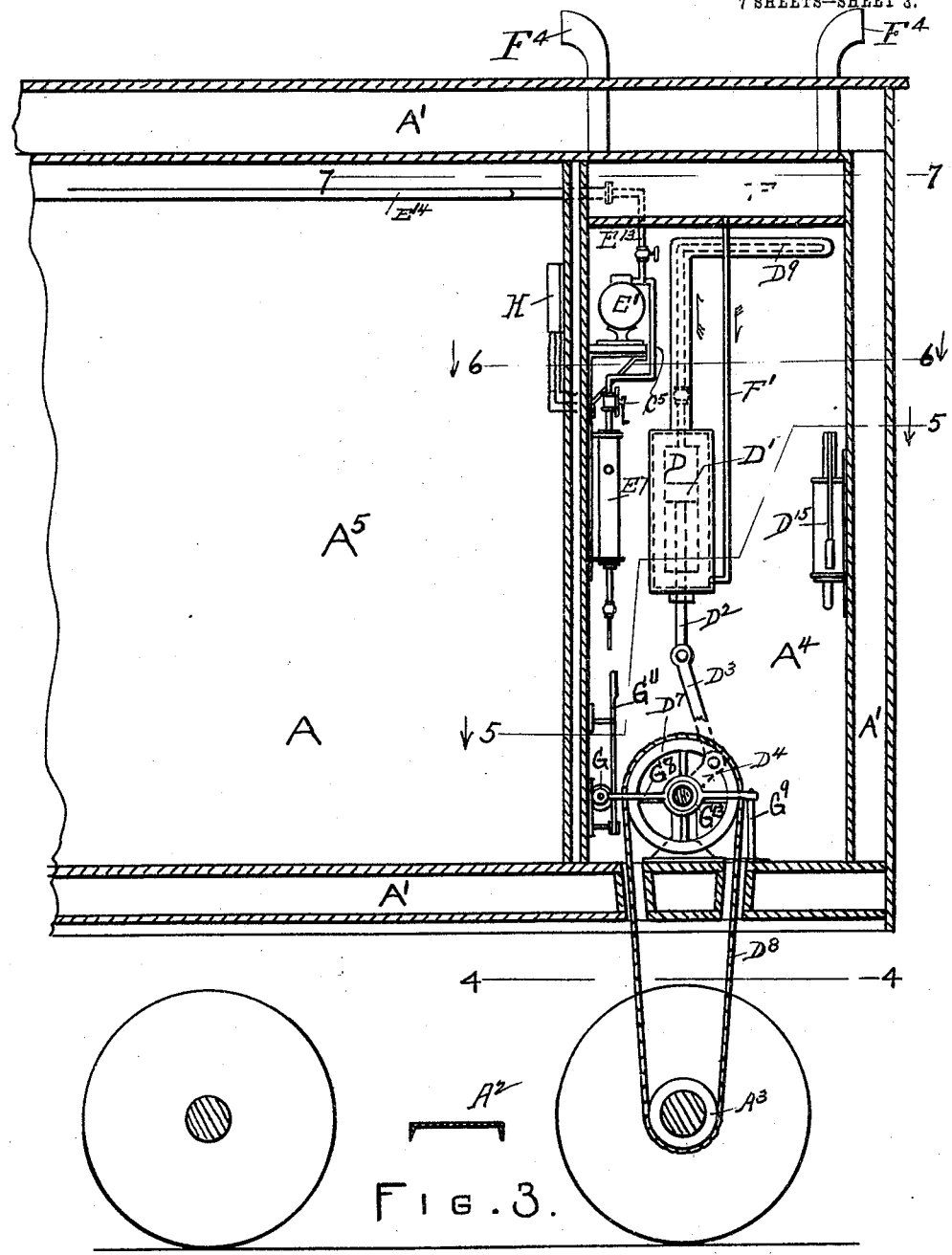
Figure 5:
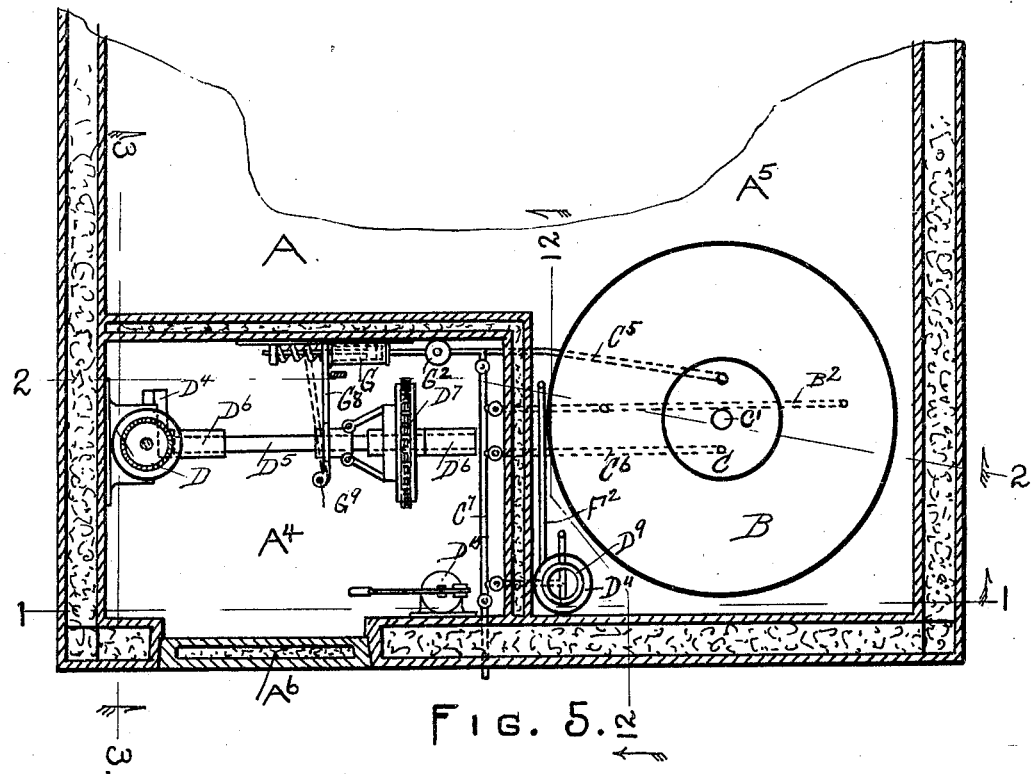
Figure 4:
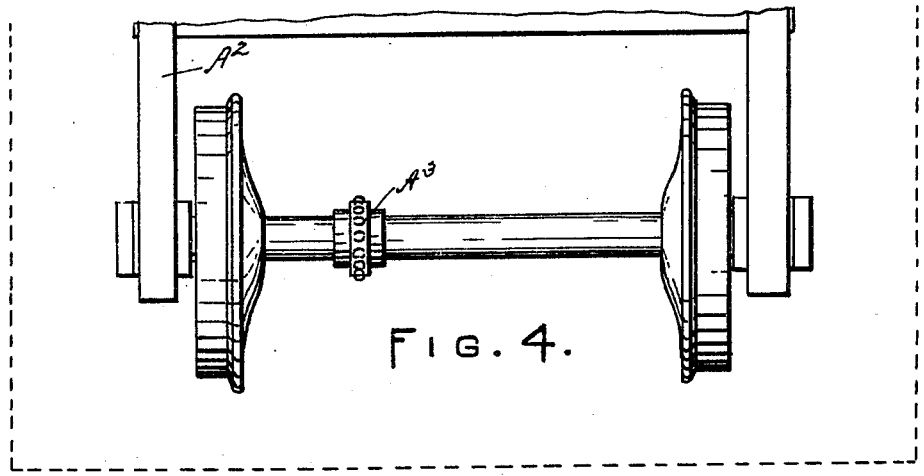
Figure 7:
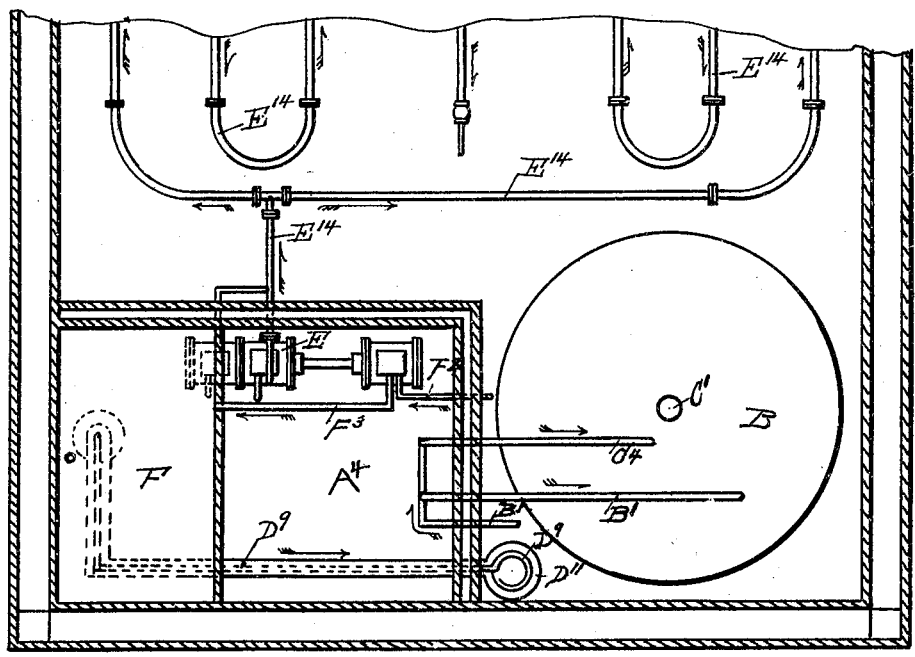
Figure 6:
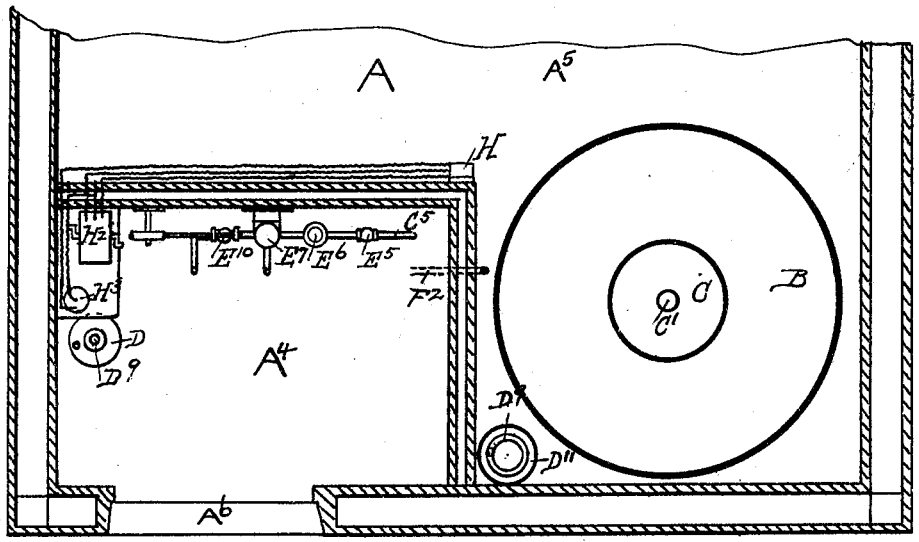

In the accompanying drawings, Figures 1 and 2 are transverse sectional views through a car equipped with my refrigerator, said views being taken on dotted line 1 1 and 2 2 of Fig. 5. Fig. 3 is a vertical section through the end of the car on dotted lines 3 3 of Fig. 5. Fig 4 is a top plan view of a portion of a car-truck, showing the sprocket-wheel secured to the car-axle, by means of which sprocket-wheel and an endless chain running thereon motion is communicated from the car-axle to the refrigerating machinery within the car. Fig. 5 is a horizontal section on dotted line 5 5 of Fig. 3, showing the relative positions of the lower parts of the refrigerating machinery. Fig. 6 is a similar view on dotted line 6 6 of Fig. 3. Fig. 7 is a similar view on dotted line 7 7 of Fig. 3. Fig. 8 is an enlarged side elevation of a portion of the clutch-operating mechanism. Fig. 9 is a detail view in plan of the spring-motor, electric battery, wires, and thermostat as arranged in connections for operating the by-pass valve. Fig. 10 is a detail view in elevation, showing the various parts used in the expansion of the air on its way from the storage-tanks to the cold room. Fig. 11 is a fragmental view illustrating a gravity-valve between the air-storage tanks for preventing the passage of air from the small tank to the larger when the former is being filled by the hand-pump. Fig. 12 is a vertical section on dotted line 12 12 of Fig. 5, showing the air-cooling tank and portions of the air and water pipes connected therewith. Fig. 13 is an enlarged fragmental view of parts shown in the preceding figure. Fig. 14 is a horizontal sectional view through the motor for operating the by-pass valve.

In the embodiment herein shown of this invention the interior of a car is divided into two compartments—the cold room, occupying almost all of the space within the car, and a small compartment partitioned off in one corner of the car to contain the refrigerating machinery, the air-storage tanks being located in the cold room next to this compartment.

In the construction of a railway-car equipped with my refrigerating plant I first provide a car-body A, properly insulated by double walls A', having any suitable non-conducting substance between them. The car is supported upon the usual trucks $A^2$, an axle of one of which trucks is provided with a sprocket-wheel $A^3$, rigidly secured upon said axle. In one corner of the car I partition off from the main portion thereof a small room $A^4$ for the refrigerating machinery, the cold room $A^5$ occupying all of the space within the car outside of the room for said machinery. At the end of the car I provide a door $A^6$ to give access to the room $A^4$.

Within the cold room, adjacent to the room $A^4$, I place a large air-storage tank B and within the latter a small storage-tank C. Extending centrally of said small tank C and communicating at each end with the air outside the tank is a pipe C' to permit a circulation of air for cooling the tank. The small tank C communicates with the large tank by a single opening $C^2$ in the wall of said small tank, which opening is adapted to be closed by the gravity-valve $C^3$. Supply-pipes $B'$ and $C^4$ communicate with the interior of the tanks B and C, respectively, and a discharge-pipe $C^5$ with the interior of the small tank C. Drain-pipes $B^2$ and $C^6$ have communication with the bottoms of the tanks B and C, respectively, to carry off the water which may accumulate therein, said pipes connecting with the drain-pipe $C^7$, which extends to a point outside the car.

At some distance from the floor of the room $A^4$, I secure to the side wall of the car a compressing-pump, having the water-jacketed cylinder D, with a piston $D'$ and a piston-rod $D^2$. A connecting-rod $D^3$ makes suitable connection with a crank $D^4$, rigidly fixed at the end of a shaft $D^5$, rotatably supported above the floor of the car in the journal-bearings $D^6$. The shaft $D^5$ carries a sprocket-wheel $D^7$, loosely mounted on said shaft, and this sprocket-wheel is connected, by means of the endless chain belt $D^8$, with the sprocket-wheel $A^3$, fixed upon one of the axles of the car. The sprocket-wheel $D^7$ carries a friction-clutch adapted to be engaged or disengaged by a mechanism to be hereinafter described when the pressure in the air-tanks exceeds a predetermined amount.

$D^9$ is a pipe provided with a water-jacket $D^{10}$ for conveying the compressed air from the compressing-pump to a cooling-tank $D^{11}$, located in the cold room, within which tank the pipe $D^9$ is coiled to provide a larger cooling-surface for the air. After leaving the cooling-tank the air passing through the pipes $D^9$, $B'$, and $C^4$ enters the tanks B and C. The pipes $B'$ and $C^4$ are provided with valves $D^{12}$ and $D^{13}$, respectively, and the pipe $D^9$ communicates near its exit from the cooling-tank with the drain-pipe $C^7$ by means of the pipe $D^{14}$. For cooling the car during loading or for continuing the refrigeration should the car be stopped while in transit I mount upon the inner wall of the room $A^4$ the hand compression-pump $D^{15}$, communicating with the pipe $D^9$ within the cooling-tank $D^{11}$ by means of the pipe $D^{16}$, said latter pipe being furnished with a valve $D^{17}$.

E and $E'$ are two cylinders of an expansion-engine having a piston-rod $E^2$ and the usual pistons and slide-valves. (Not shown.) A pump-cylinder $E^3$ is alined with the cylinders E and $E'$ of the expansion-engine and has a piston (not shown) secured to the piston-rod $E^2$. The cylinder E is the principal cylinder, and the cylinder $E'$ a supplementary cylinder adapted to receive a quantity of the compressed air, which quantity is governed by an automatic mechanism to be later herein described. The pressure-pipe $C^5$ from the small air-tank C leads through an absorbing-chamber $E^4$, filled with a material adapted to absorb water, through the valve $E^5$, through a reducing-valve $E^6$ of common construction, through a second absorbing-chamber $E^7$, through a regulating-valve $E^8$, having an operating-lever $E^9$, to the valve-chamber of said cylinder E. The regulating-valve $E^8$ is set to admit a certain quantity of compressed air into the valve of said cylinder. In order to provide for the application of a greater amount of compressed air to counteract a rise in the temperature of the cold room, I provide the by-pass valve $E^{10}$, the operation of which valve is controlled by a thermostat to be later herein described. $E^{11}$ is a pipe for conveying air from said by-pass valve $E^{10}$ to the supplementary cylinder $E'$.

$E^{12}$ and $E^{13}$ are pipes for carrying the exhaust-air from the cylinders E and $E'$, respectively, to the refrigerating-pipes $E^{14}$ in the cold room, which pipes $E^{14}$ are maintained at a low temperature by the passage therethrough of the expanded air. A downward extension $E^{15}$ of the pipe $E^{11}$ and a short pipe $E^{16}$, extending downward from the lower end of the absorbing-chamber $E^7$, form condensation-drips for the pipe $E^{11}$ and the chamber $E^7$, respectively. The pressure-pipe $C^5$ has connection at a point below the absorbing-chamber $E^4$ with the pipe $C^7$ to carry off the water that is removed from the air in its passage through said chamber.

The water-jacket of the compression-pump has communication with the jacket $D^{10}$ of the pipe $D^9$, and said jacket $D^{10}$ is connected to the cooling-tank $D^{11}$. To provide a supply of water for said jackets and tank, I place in the upper part of the machinery-room $A^4$ a tank F, a pipe $F'$ connecting said tank with the water-jacket of the compression-pump. From the lower portion of the cooling-tank $D^{11}$ extends a pipe $F^2$, which conveys the jacket-water to the pump-cylinder $E^3$ of the expansion-engine, from whence it is forced through the pipe $F^3$ back to the tank F.

$F^4$ represents funnels extending upwardly from the tank F through the roof of the car to permit a circulation of air through said tank.

The circulation of water commences as soon as the expanding-engine begins to operate. At the time of starting the compressing-pump the water is at the temperature of the surrounding bodies. Until the expanding-engine begins to operate, the water in the water-jackets, the tank F, and the auxiliary tank $D^{11}$ in the cold room is obliged to take up the heat of compression, and therefore a sufficient quantity of water must be provided in said water-jackets to absorb said heat until the expanding-engine begins to work. Thereafter the cooling of the water is regular and continuous. In passing through the water-jackets of the pump-cylinder D and the water-jacket $D^{10}$ the jacket-water gives up to the air in the machinery-room much of the heat absorbed from the compressed air. The water passes through the auxiliary tank $D^{11}$ in the cold room continually as long as the expanding-engine is working, while the air from the compressor passes through said tank only intermittently, as a result of which the water is exposed at all times to the influence of the cold room and is only occasionally brought into contact with a small part of the heat of compression.

To stop the operation of the compression-pump when the pressure in the tanks B and C exceeds a predetermined point, I provide the mechanism which I will now describe. This mechanism comprises a cylinder G, secured to one of the walls of the room $A^4$, said cylinder having communication with the pressure-pipe $C^5$ by means of the pipe $G'$. In this pipe $G'$ is located a safety-valve $G^2$, adapted to be set to relieve a pressure in the tanks above any desired maximum. The cylinder G is provided with a piston $G^3$, a petcock $G^4$ normally slightly open, and a piston-rod $G^5$, the movement of the outer end of which rod is guided by the guide-plate $G^6$, secured at a suitable point upon the wall adjacent to the cylinder G. A shifting lever $G^8$ for operating the friction-clutch is pivotally mounted upon a support $G^9$, the free end of said lever surrounding the piston-rod $G^5$ and lying in contact with the pin $G^7$, extending through said piston-rod. A stud $G^{10}$ supports the pivotal hand-lever $G^{11}$, which lever lies behind the shifting lever $G^8$. $G^{14}$ is a toothed sector for holding said lever in a position to disengage the clutch, and $G^{15}$ is an open coil-spring surrounding the piston-rod $G^5$, the tendency of which spring is to throw the clutch into engagement and to move the hand-lever $G^{11}$ upon its pivot. It will thus be seen that when the maximum pressure in the storage-tanks B and C is exceeded compressed air will be admitted by the valve $G^2$ into the cylinder G, moving the piston-rod $G^5$ and moving the shifting lever $G^8$ in a direction to throw the shaft $D^5$ out of engagement with the driving-sprocket $D^7$, thus stopping the compression of air until the pressure in the air-tanks has subsided to the maximum for which the valve $G^2$ is set, when the latter will close communication between the tanks and the cylinder G. The compressed air in said cylinder G gradually exhausts through the petcock $G^4$, enabling the spring $G^{15}$ to move the shifting lever $G^8$, and thereby to place the pump-shaft $D^5$ again in engagement with the driving-sprocket.

It will be seen that the compression of air is carried on only at irregular intervals, being interrupted when the maximum pressure desired in the storage-tanks is reached and when the travel of the car is stopped. The expanding-engine, on the other hand, works continuously, causing a constant circulation of the cooling-water through the tank $D^{11}$ and the tank F.

I will now describe the apparatus employed to govern the operation of the by-pass valve $E^{10}$, that is provided to permit the application of an increased amount of compressed air when changed conditions tend to cause a rise in the temperature of the air in the cold room. This apparatus comprises a thermostat, a spring-motor for actuating the by-pass valve, and a battery and electromagnets for controlling the operation of the spring-motor. In this instance I have employed a mechanical thermostat—to wit, a zinc coil H, one end of which is secured to a suitable support and the free end of which is connected with the pivoted finger $H'$. This finger is in electrical communication with one pole of a battery $H^3$. The finger $H'$ is free to move between the two contact-points $a$ and $b$, the first of which is electrically connected with a coil $H^4$ and the latter with a coil $H^5$. A wire $H^6$ connects each of the coils $H^4$ and $H^5$ with the opposite pole of the battery $H^3$. A pivoted detent-armature $H^7$ is adapted to be engaged by diametrically opposite projections on the shaft $H^8$, which shaft is geared to a spring-motor $H^9$ and has at its opposite ends the cranks $H^{10}$ and $H^{11}$, connected, by means of the chains $H^{12}$ and $H^{13}$, with the operating-lever $H^{14}$ of the by-pass valve $E^{10}$ in order to regulate the flow of compressed air through said valve. The detent-armature $H^7$ prevents the rotation of the shaft $H^8$ save when the position of the thermostat is changed and the electric circuits altered. The thermostat is located within the cold room, and when the temperature changes the zinc coil H is caused by expansion or contraction to move the finger $H'$ sidewise between the two contacts $a$ and $b$. When the pivoted finger $H'$ is in contact with the contact-point $a$, the coil $H^4$ will attract the detent-lever, and when the finger $H'$ is in electric contact with the contact-point $b$ the coil $H^5$ will attract said detent-lever. A movement of the finger from one contact-point to the other thus effects a movement of the detent-lever upon its pivot and permits a one-half revolution of the shaft $H^8$ and a consequent change in the adjustment of the by-pass valve $E^{10}$.

When a car equipped with my refrigerator is in use, the air-storage tanks B and C are filled by the power compression-pump or, in cooling the car while loading, by compressing air within the small tank C by means of the hand-pump $D^{15}$, first closing in the latter case the valve $D^{12}$ to cut out the large tank B. The compressed air within the tanks passes through the pipe $C^5$, the absorbing-chamber $E^4$, the valve $E^5$, the reducing-valve $E^6$, the second absorbing-chamber $E^7$, the regulating-valve $E^8$, and into the cylinder E of the expansion-engine. Here the air-pressure causes the piston-rod $E^2$ to be reciprocated, and the expanding cold air is exhausted from the cylinder E into the refrigerating-pipes in the cold room, through which pipes the air is forced by the pressure of the exhaust. The operation of the expansion-engine causes a circulation of the jacket-water by means of the pump-cylinder $E^3$, through the pipe $F^3$, the water-tank F, the pipe $F'$, the water-jacket of the compression-pump, the jacket $D^{10}$ of the supply-pipe $D^9$, the cooling-tank $D^{11}$, and the pipe $F^2$.

Should the pressure within the air-tanks B and C exceed the maximum for which the safety-valve $G^2$ is set, said valve will open communication between the tanks and the cylinder G, and the pressure of the air will actuate the clutch-operating mechanism, as hereinbefore described, to disengage the clutch and stop the operation of the compression-pump. When the pressure within the tanks has been lowered to the maximum, the safety-valve $G^2$ will close and the spring $G^{15}$ will actuate the clutch-operating mechanism to place the pump-shaft $D^5$ again in operative connection with the driving means.

It is apparent that many changes might be made in the form and arrangement of the various parts used in that embodiment of my invention which is described herein without departing from the spirit and scope of my said invention, wherefore I desire to have it understood that I do not wish to limit myself to the specific construction herein set forth.

I claim as my invention—

1. In a refrigerator, in combination, an air-compressor; a storage-tank for the compressed air; a cylinder adapted to have communication with said tank; an adjustable pressure-valve for said tank, adapted to open and close communication between said tank and said cylinder; a piston in said cylinder; means actuated by the movement of said piston for stopping the operation of said air-compressor; an expansion-engine adapted to be driven by the compressed air; a cold room; means for cooling said cold room with the exhaust from said engine; and means actuated by variations of temperature within said cold room, for varying the supply of compressed air to said engine.

2. In a refrigerator, in combination, an air-compressor; a clutch for connecting said compressor with a source of power; a storage-tank for the compressed air; a cylinder adapted to have communication with said tank; an adjustable pressure-valve for said tank, adapted to open and close communication between said tank and said cylinder; a lever for operating said clutch; a piston in said cylinder for moving said lever to disconnect said compressor from its source of power; an expansion-engine adapted to be driven by the compressed air; a cold room; means for cooling said cold room with the exhaust from said engine; and means actuated by variations of temperature within said cold room, for varying the supply of compressed air to said engine.

3. In a refrigerator, in combination, an air-compressor; a storage-tank for the compressed air; a cylinder adapted to have communication with said tank; an adjustable pressure-valve for said tank, adapted to open and close communication between said tank and said cylinder; a piston in said cylinder; means actuated by the movement of said piston for stopping the operation of said air-compressor; means for starting the operation of said compressor when the pressure in said tank has been lowered to a predetermined point; an expansion-engine adapted to be driven by the compressed air; a cold room; means for cooling said cold room with the exhaust from said engine; and means actuated by variations of temperature within said cold room, for varying the supply of compressed air to said engine.

4. In a refrigerator, in combination, an air-compressor; a clutch for connecting said compressor with a source of power; a storage-tank for the compressed air; a cylinder adapted to have communication with said tank; an adjustable pressure-valve for said tank, adapted to open and close communication between said tank and said cylinder; a lever for operating said clutch; a piston in said cylinder for moving said lever to disconnect said compressor from its source of power; means for starting the operation of said compressor when the pressure in said tank has been lowered to a predetermined point; an expansion-engine adapted to be driven by the compressed air; a cold room; means for cooling said cold room with the exhaust from said engine; and means actuated by variations of temperature within said cold room, for varying the supply of compressed air to said engine.

5. In a refrigerator, in combination, an air-compressor; a clutch for connecting said compressor with a source of power; a storage-tank for the compressed air; a cylinder adapted to have communication with said tank when the pressure in said tank passes a predetermined point; a lever for operating said clutch; a piston in said cylinder for moving said lever to disconnect said compressor from its source of power; a spring for moving said lever to connect said compressor with its source of power when the pressure in said tank has been lowered to a predetermined point; an expansion-engine adapted to be driven by the compressed air; a cold room; means for cooling said cold room with the exhaust from said engine; and means actuated by variations of temperature within said cold room, for varying the supply of compressed air to said engine.

6. In a refrigerator, in combination, an air-compressor; a clutch for connecting said compressor with a source of power; a storage-tank for the compressed air; a cylinder adapted to have communication with said tank; an adjustable pressure-valve for said tank, adapted to open and close communication between said tank and said cylinder; a lever for operating said clutch; a piston in said cylinder for moving said lever to disconnect said compressor from its source of power; a spring for moving said lever to connect said compressor with its source of power when the pressure in said tank has been lowered to a predetermined point; an expansion-engine adapted to be driven by the compressed air; a cold room; means for cooling said cold room with the exhaust from said engine; and means actuated by variations of temperature within said cold room, for varying the supply of compressed air to said engine.

7. In a refrigerator, in combination, an air-compressor; a storage-tank for the compressed air; a cylinder adapted to have communication with said tank; an adjustable pressure-valve for said tank, adapted to open and close communication between said tank and said cylinder; a piston in said cylinder; means actuated by the movement of said piston for stopping the operation of said air-compressor; an expansion-engine adapted to be driven by the compressed air; a pump driven by said engine for causing a circulation of water for cooling the compressed air; a cold room; means for cooling said cold room with the exhaust from said engine; and means actuated by variations of temperature within said cold room, for varying the supply of compressed air to said engine.

8. In a refrigerator, in combination, an air-compressor; a clutch for connecting said compressor with a source of power; a storage-tank for the compressed air; a cylinder adapted to have communication with said tank; an adjustable pressure-valve for said tank, adapted to open and close communication between said tank and said cylinder; a lever for operating said clutch; a piston in said cylinder for moving said lever to disconnect said compressor from its source of power; an expansion-engine adapted to be driven by the compressed air; a pump driven by said engine for causing a circulation of water for cooling the compressed air; a cold room; means for cooling said cold room with the exhaust from said engine; and means actuated by variations of temperature within said cold room, for varying the supply of compressed air to said engine.

9. In a refrigerator, in combination, an air-compressor; a storage-tank for the compressed air; a cylinder adapted to have communication with said tank; an adjustable pressure-valve for said tank, adapted to open and close communication between said tank and said cylinder; a piston in said cylinder; means actuated by the movement of said piston for stopping the operation of said air-compressor; means for starting the operation of said compressor when the pressure in said tank has been lowered to a predetermined point; an expansion-engine adapted to be driven by the compressed air; a pump driven by said engine for causing a circulation of water for cooling the compressed air; a cold room; means for cooling said cold room with the exhaust from said engine; and means actuated by variations of temperature within said cold room, for varying the supply of compressed air to said engine.

10. In a refrigerator, in combination, an air-compressor; a clutch for connecting said compressor with a source of power; a storage-tank for the compressed air; a cylinder adapted to have communication with said tank; an adjustable pressure-valve for said tank, adapted to open and close communication between said tank and said cylinder; a lever for operating said clutch; a piston in said cylinder for moving said lever to disconnect said compressor from its source of power; means for starting the operation of said compressor when the pressure in said tank has been lowered to a predetermined point; an expansion-engine adapted to be driven by the compressed air; a pump driven by said engine for causing a circulation of water for cooling the compressed air; a cold room; means for cooling said cold room with the exhaust from said engine; and means actuated by variations of temperature within said cold room, for varying the supply of compressed air to said engine.

11. In a refrigerator, in combination, an air-compressor; a clutch for connecting said compressor with a source of power; a storage-tank for the compressed air; a cylinder adapted to have communication with said tank; an adjustable pressure-valve for said tank, adapted to open and close communication between said tank and said cylinder; a lever for operating said clutch; a piston in said cylinder for moving said lever to disconnect said compressor from its source of power; a spring for moving said lever to connect said compressor with its source of power when the pressure in said tank has been lowered to a predetermined point; an expansion-engine adapted to be driven by the compressed air; a pump driven by said engine for causing a circulation of water for cooling the compressed air; a cold room; means for cooling said cold room with the exhaust from said engine; and means actuated by variations of temperature within said cold room, for varying the supply of compressed air to said engine.

12. In a refrigerator, in combination, an air-compressor; a storage-tank for the compressed air; an expansion-engine adapted to be driven by the compressed air; a cold room; means for cooling said cold room with the exhaust from said engine; an adjustable valve for delivering a predetermined quantity of compressed air to said engine; a by-pass valve for delivering an additional quantity of compressed air to said engine; and means actuated by variations of temperature within said cold room, for operating said by-pass valve.

13. In a refrigerator, in combination, an air-compressor; a storage-tank for the compressed air; a cylinder adapted to have communication with said tank when the pressure in said tank passes a predetermined point; a piston in said cylinder; means actuated by the movement of said piston for stopping the operation of said air-compressor; an expansion-engine adapted to be driven by the compressed air; a cold room; means for cooling said cold room with the exhaust from said engine; an adjustable valve for delivering a predetermined quantity of compressed air to said engine; a by-pass valve for delivering an additional quantity of compressed air to said engine; and means actuated by variations of temperature within said cold room for operating said by-pass valve.

14. In a refrigerator, in combination, an air-compressor; a storage-tank for the compressed air; means actuated by the pressure within said tank for stopping the operation of said air-compressor when the pressure in said tank passes a predetermined point; means for starting the operation of said compressor when the pressure in said tank has been lowered to a predetermined point; an expansion-engine adapted to be driven by the compressed air; a cold room; means for cooling said cold room with the exhaust from said engine; an adjustable valve for delivering a predetermined quantity of compressed air to said engine; a by-pass valve for delivering an additional quantity of compressed air to said engine; and means actuated by variations of temperature within said cold room, for operating said by-pass valve.

15. In a refrigerator, in combination, an air-compressor; a clutch for connecting said compressor with a source of power; a storage-tank for the compressed air; a cylinder adapted to have communication with said tank when the pressure in said tank passes a predetermined point; a lever for operating said clutch; a piston in said cylinder for moving said lever to disconnect said compressor from its source of power; a spring for moving said lever to connect said compressor with its source of power when the pressure in said tank has been lowered to a predetermined point; an expansion-engine adapted to be driven by the compressed air; a cold room; means for cooling said cold room with the exhaust from said engine; an adjustable valve for delivering a predetermined quantity of compressed air to said engine; a by-pass valve for delivering an additional quantity of compressed air to said engine; and means actuated by variations of temperature within said cold room, for operating said by-pass valve.

16. In a refrigerator, in combination, an air-compressor; a storage-tank for the compressed air; an expansion-engine adapted to be driven by the compressed air; a pump driven by said engine for causing a circulation of water for cooling the compressed air; a cold room; means for cooling said cold room with the exhaust from said engine; an adjustable valve for delivering a predetermined quantity of compressed air to said engine; a by-pass valve for delivering an additional quantity of compressed air to said engine; and means actuated by variations of temperature within said cold room, for operating said by-pass valve.

17. In a refrigerator, in combination, an air-compressor; a storage-tank for the compressed air; means actuated by the pressure within said tank for stopping the operation of said compressor when the pressure in said tank passes a predetermined point; means for starting the operation of said compressor when the pressure in said tank has been lowered to a predetermined point; an expansion-engine adapted to be driven by the compressed air; a pump driven by said engine for causing a circulation of water for cooling the compressed air; a cold room; means for cooling said cold room with the exhaust from said engine; an adjustable valve for delivering a predetermined quantity of compressed air to said engine; a by-pass valve for delivering an additional quantity of compressed air to said engine; and means actuated by variations of temperature within said cold room for operating said by-pass valve.

18. In a refrigerator, in combination, a cold room; a storage-tank for compressed air; a smaller air-storage tank within said first-mentioned tank; a valve adapted to prevent the passage of compressed air from the smaller tank to the larger tank; an air-compressor arranged to deliver compressed air to each of said tanks; a second air-compressor arranged to deliver compressed air to said smaller tank; an expansion-engine adapted to be driven by the compressed air; means of communication between said smaller storage-tank and said engine; and means for cooling said cold room with the exhaust from said engine.

19. In a refrigerator-car, in combination, a cold room; an air-compressor; means for driving said air-compressor with power from the car-axle; a storage-tank for the compressed air; an expansion-engine; an adjustable valve for delivering a predetermined quantity of compressed air to said engine; a by-pass valve; and means actuated by variations of temperature within said cold room for operating said by-pass valve.

20. In a refrigerator-car, in combination, a cold room; an air-compressor; means for driving said air-compressor with power from the car-axle; a storage-tank for the compressed air; an expansion-engine; an adjustable valve for delivering a predetermined quantity of compressed air to said engine; a by-pass valve; means actuated by variations of temperature in said cold room for operating said by-pass valve; and means actuated by the pressure within said storage-tank for stopping the operation of said air-compressor when the pressure in said tank passes a predetermined point.

21. In a refrigerator-car, in combination, a car-body; trucks for supporting said car-body, one of said trucks comprising a rotatable axle; a sprocket-wheel on said axle; a rotatable shaft journaled within said car-body; an air-compression pump operatively connected to said shaft; a sprocket-wheel loosely mounted on said shaft, said wheel carrying one member of a two-part clutch; a corresponding clutch member slidably mounted on said shaft; a chain belt extending over the sprocket-wheel on said axle and the sprocket-wheel on said shaft; a storage-tank for the compressed air; a cylinder adapted to have communication with said tank; an adjustable pressure-valve for said tank, adapted to open and close communication between said tank and said cylinder; a lever for sliding said slidable clutch member; a piston in said cylinder for moving said lever; an expansion-engine adapted to be driven by the compressed air; a cold room; pipes in said cold room for receiving the exhaust from said engine; and means actuated by variations of temperature within said cold room, for varying the supply of compressed air to said engine.

GEORGE A. MASTERS.

Witnesses:
L. L. MILLER,
GEO. L. CHINDAHL.